June 10, 1969  A. RAUH ET AL  3,448,829
PUMP DRIVING CONNECTION, ESPECIALLY FOR MOTOR CHAIN SAWS
Filed Aug. 19, 1966

Inventors:
Albrecht Rauh
Richard Heermann
By

United States Patent Office 3,448,829
Patented June 10, 1969

3,448,829
PUMP DRIVING CONNECTION, ESPECIALLY FOR MOTOR CHAIN SAWS
Albrecht Rauh, Kleinheppach, and Richard Heermann, Hebsack, Germany, assignors to Andreas Stihl Maschinenfabrik Neustadt, Waiblingen, Germany
Filed Aug. 19, 1966, Ser. No. 573,602
Claims priority, application Germany, Aug. 20, 1965, St 24,298
Int. Cl. F16n 7/14, 7/36, 13/10
U.S. Cl. 184—27      4 Claims

ABSTRACT OF THE DISCLOSURE

A motor-driven chain saw, the housing of which is provided with a tubular extension through which the motor drive shaft extends. A lubricating pump mounted within the extension and driven by a worm and worm wheel the latter of which is journaled on the drive shaft for rotation thereabout. The worm wheel is pinned to a chain sprocket mounted externally of the housing and which is also journaled for rotation on the drive shaft, and the sprocket is in turn fixedly secured to the drum portion of a centrifugal clutch mounted on the end of the drive shaft.

---

The present invention relates to motor chain saws including a driving motor the crankshaft of which is connected to a sprocket wheel for the chain saw through the intervention of a centrifugal clutch, while a lubricating pump is provided which is adapted to be driven through the intervention of said centrifugal clutch.

Motor chain saws with lubricating pumps are known in which the pump is driven by the crankshaft of the motor through the intervention of a worm and worm wheel. With this known arrangement, the worm is either fixedly connected to the crankshaft or is coupled thereto by a plug clutch. A construction of this type has the drawback that oil will be delivered as long as the driving motor runs. During the idling of the motor, however, the centrifugal clutch is disengaged so that the saw chain stops, whereas the lubricating pump is driven further while the fed oil is not used by the stopped saw chain and is consequently lost.

Furthermore, motor chain saws have become known in which the drive of the lubricating pump is effected not directly by the crankshaft but by a separate shaft outside the crankshaft and through the intervention of a centrifugal clutch. Motor chain saws of this type have the drawback that special bearing means are required for the separate shaft while this connection requires considerable space so that the motor chain saw becomes relatively bulky. Moreover, motor chain saws of this type are expensive to produce and are complicated with regard to the assembly thereof.

It is, therefore, an object of the present invention to provide a motor chain saw and, more specifically, a lubricating pump drive therefor, which will overcome the above-mentioned drawbacks.

It is another object of this invention to provide an arrangement as set forth in the preceding paragraph, which will assure that the lubricating pump is delivering oil only when the saw chain is in operation.

Still another object of this invention consists in the provision of an arrangement as set forth above, in which the drive for the lubricating pump is simple and trouble-free and can be limited to a minimum of space.

It is also an object of this invention to provide an arrangement of the above-mentioned type in which the lubrication of the oil pump and its drive will be effected automatically and in a simple manner.

Figure 1:
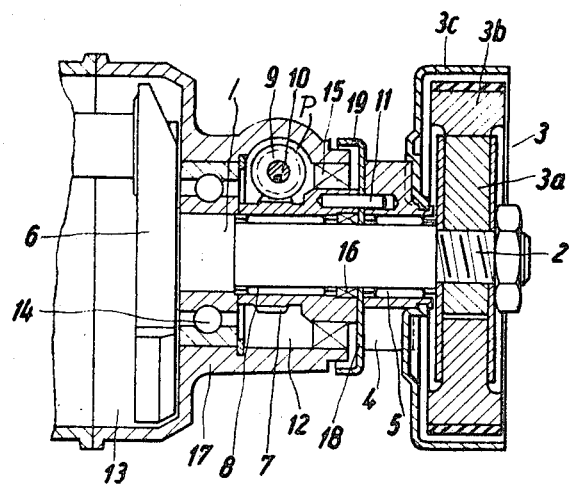
Figure 2:
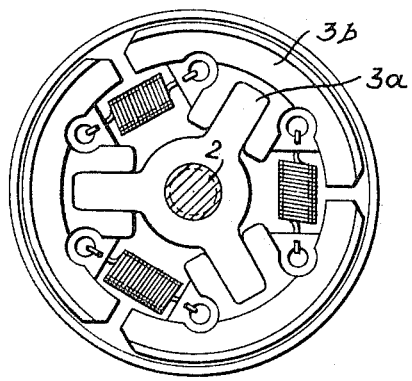

These and other objects and advantages of the invention will appear more clearly from the following specification in connection with the accompanying drawing, in which FIG. 1 illustrates partly in section the driving connection of the crankshaft of the driving motor for a chain saw with the lubricating pump. FIGURE 2 is an end view of FIGURE 1 looking in at the right side of FIGURE 1, but with the outer cover plate and the retaining nut removed.

The present invention is characterized primarily in that between a crank web of the crankshaft and the sprocket wheel for the saw chain there is provided a driving wheel for the direct drive of the lubricating pump, said driving wheel being rotatably journalled on the crankshaft. The driving wheel is drivingly connected to the sprocket wheel at least with regard to the driving direction of the latter. According to this arrangement, the lubricating pump will be driven only when the sprocket wheel is in operation so that lubricating oil will be delivered only during the operation of the sprocket wheel, i.e., when the sprocket wheel drives the chain saw. In view of the rotatable journalling of the driving wheel on the crankshaft, a particularly small dimensioning of the motor chain saw will be assured.

Referring now more specifically to the drawing, the latter shows a portion of a motor or engine having a crankshaft 1. Mounted on the crankshaft output portion 2 and connected thereto, for instance, by a nut, is a centrifugal clutch 3. That portion 3a of clutch 3 which is provided with the radially movable clutch elements 3b is connected to the crankshaft end 2, whereas the clutch drum part 3c of clutch 3 which at a corresponding speed of rotation of crankshaft 1 will be engaged and taken along by the clutch elements 3b is connected to a sprocket wheel 4 in any convenient manner, e.g., by pressing the teeth of the sprocket wheel 1.5 millimeters deep into the adjacent end face of clutch drum part 3c. Sprocket wheel 4 is rotatably journalled on crankshaft 1 through the intervention of a needle bearing 5 and engages and drives the saw chain (not shown) of the motor chain saw.

Between the sprocket wheel 4 and a crank web 6 of crankshaft 1 there is provided a driving worm 7 which is rotatably journalled on crankshaft 1 by means of a needle bearing 8. Driving worm 7 meshes with a worm wheel 9 which is keyed to the shaft 10 of a lubricating pump P. The axis of the worm wheel 9 of lubricating pump P extends transverse to the axis of worm 7. Worm 7 is detachably connected to sprocket wheel 4 through the intervention of a pin 11 extending in the direction of the axis of crankshaft 1.

When the centrifugal clutch 3 is disengaged, sprocket wheel 4 and the chain saw driven thereby are at a standstill so that also lubricating pump P which is to be driven by sprocket wheel 4 will be at a standstill. Consequently, in these conditions no oil is delivered and lost. When the centrifugal clutch 3 is engaged and as a result thereof the sprocket wheel 4 is rotated, also the lubricating pump P is operated and feeds lubricating oil to the saw chain.

As will also be seen from the drawing, worm 7 and worm wheel 9 as well as lubricating pump P are arranged in a tubular extension 17 which forms a part of and projects from the motor housing. Extension 17 forms a housing section 12 and crankshaft 1 is in a housing section 13. Between the housing sections 12 and 13 there is provided a bearing 14 for the crankshaft 1. Housing section 12 is sealed toward the outside by means of a sealing ring 15 resting against the housing section 12, and is furthermore sealed toward the outside by a sealing ring 16 resting against crankshaft 1.

As will be evident from the above, the structure described above will permit a particularly simple lubrication of worm 7 and lubricating pump P inasmuch as the same are lubricated by the lubrication of the crankshaft 1 and crankshaft bearing 14. In order to prevent soil or foreign bodies from entering the housing section 12 from the outside, there is provided a cup-shaped cover plate 18 having its rim portion 19 directed toward the driving worm 7. Plate or disc 18 is fixedly connected to sprocket wheel 4 or the driving worm 7 and is located therebetween.

Summarizing the advantages of an arrangement according to the present invention, it will be seen from the above that the rotatable journalling of the driving element or worm 7 on crankshaft 1 permits a particularly compact dimensioning of the motor chain saw. Furthermore, worm 7, while affording a high stepdown ratio, will assure a noiseless and quiet running of the lubricating pump drive. The pin connection 11 between the sprocket wheel and worm 7 permits a simple assembly of the driving elements for the lubricating pump.

In view of the fact that the worm wheel and the oil pump are arranged in the housing means housing the crankshaft bearing while the housing is properly sealed toward the outside, the drive for the lubricating pump and also the pump itself can be lubricated by the lubrication for the crankshaft. The driving motor itself may, if desired, be a two-stroke cycle engine.

The provision of the cup-shaped cover plate or disc 18 prevents soil or saw chips or the like from entering the chamber or housing means receiving the pump.

It is, of course, to be understood that the present invention is, by no means, limited to the particular arrangement shown in the drawing, but also comprises any modifications within the scope of the appended claims.

We claim:
1. In combination, for use with a motor driven chain saw: a motor having a housing and a crankshaft rotatable therein, said crankshaft having an output portion at one end, said housing having a tubular portion projecting therefrom and through which said output portion extends, a bearing supporting said output portion in said tubular portion at the housing end of the tubular portion and seal means sealing said output portion to said tubular portion at the outer end of the tubular portion, a sprocket journalled on said output portion at the outer end of said tubular portion and a centrifugal clutch on the extreme outer end of said output portion connecting said output portion with said sprocket, an oil pump in said tubular portion for supplying oil to the chain of the chain saw and having an input shaft, a first gear on said input shaft, a second gear meshing with said first gear and journalled on said output portion of said crankshaft between said bearing and said seal means, and drive means drivingly connecting said sprocket with said second gear so the pump is driven only when said sprocket is driven, said tubular portion receiving oil from said housing through said bearing.

2. An arrangement according to claim 1, in which said first and second gears comprise a worm and a worm wheel.

3. An arrangement according to claim 1 in which said drive means comprises an axial pin and axial bores in said sprocket and said second gear receiving said pin.

4. An arrangement according to claim 1, which includes a cover plate arranged between said sprocket and said second gear at the outer end of said tubular portion and having a marginal axial flange surrounding the outer end of said tubular portion.

References Cited

UNITED STATES PATENTS

| | | |
|---|---|---|
| 1,553,225 | 9/1925 | Fekete et al. |
| 2,364,132 | 12/1944 | De Lancey. |
| 2,650,626 | 9/1953 | Kiekhaefer _____ 184—15 X |
| 2,718,908 | 9/1955 | Kiekhaefer _____ 143—32 |
| 2,809,718 | 10/1957 | Kos. |
| 3,144,890 | 8/1964 | Irgens _____ 143—32 |

FOREIGN PATENTS 221,659   8/1942   Switzerland.

LAVERNE D. GEIGER, *Primary Examiner.*

E. J. EARLS, *Assistant Examiner.*

U.S. Cl. X.R.

103—23; 143—32; 184—15